United States Patent [19]

Perkins et al.

[11] 4,342,442
[45] Aug. 3, 1982

[54] BATTERY CONTAINER MOLD

[75] Inventors: William J. Perkins; William C. Vest, both of Anderson; Walter A. Grannen, III, Bargersville; Robert E. Meyer, Indianapolis, all of Ind.

[73] Assignee: General Motors Corporation, Detroit, Mich.

[21] Appl. No.: 264,241

[22] Filed: May 18, 1981

Related U.S. Application Data

[63] Continuation of Ser. No. 172,513, Jul. 28, 1980, abandoned.

[51] Int. Cl.³ .................... B29C 1/06; B29C 7/00; B29F 1/022; B29F 1/14
[52] U.S. Cl. .................................. 249/67; 249/64; 425/438; 425/577
[58] Field of Search ............... 249/64, 67, 68; 425/DIG. 5, DIG. 58, 468, 577

[56] References Cited

U.S. PATENT DOCUMENTS

| 3,473,197 | 4/1969 | Wilds | 425/577 |
|---|---|---|---|
| 3,509,603 | 5/1970 | Halsall et al. | 425/64 X |
| 3,564,660 | 2/1971 | Darnell | 425/577 X |
| 3,607,440 | 9/1971 | Daniel et al. | |
| 3,767,156 | 10/1973 | Sullivan | 425/577 X |
| 3,816,047 | 6/1974 | Mohler | 425/577 |
| 3,905,740 | 9/1975 | Lovejoy | 425/468 X |
| 3,930,780 | 1/1976 | Lovejoy | 425/577 X |
| 3,969,055 | 7/1976 | Buckethal | 425/577 X |
| 4,041,603 | 8/1977 | Thune | |

Primary Examiner—J. Howard Flint, Jr.
Attorney, Agent, or Firm—Lawrence B. Plant

[57] ABSTRACT

Mold for injection molding battery containers which include a plurality of thin resilient ribs integral with and projecting at acute angles from the inside walls thereof into the cell compartment(s) to hold the battery's innards therein. The core of the mold includes a mandrel defining the cell compartment. The mandrel has dovetail-like mortises therein and complementary-shaped ejector bars reciprocally slideable within the mortises between retracted and extended positions to facilitate stripping the container from the core. The rib-forming portion of the mold cavity is formed in the side walls of the ejector bar. The ejector bars travel with the container during at least part of the ejection cycle so as to free the rib from the rib-forming cavity without untoward resistance or permanent deformation of the ribs.

6 Claims, 9 Drawing Figures

BATTERY CONTAINER MOLD

This is a continuation of application Ser. No. 172,513, filed July 28, 1980, now abandoned.

BACKGROUND OF THE INVENTION

This invention relates to molds for injection molding battery containers, the walls of which have thin, resilient, integrally molded ribs projecting at acute angles into the cell compartment(s) defined by the walls. The ribs deflect various amounts according to the thickness of the cell elements comprising the battery's electrochemical innards and serve to firmly retain the innards in the container while cushioning them against vibration. While the invention is most particularly useful for molding multicell, lead-acid, automotive battery containers, it is also applicable to single cell and other types of batteries.

Automobile, SLI, lead-acid storage batteries have standardized outside dimensions in different size categories. The manufacturers thereof typically provide batteries with varying energy capacities in each size category. This is done by varying the number of positive and negative plates in each cell element which comprises the battery's electrochemical innards. Varying the number of plates, however, varies the thickness of the cell element to be positioned and firmly retained in the container's cell compartment(s). Lower energy batteries typically contain about nine plates per cell element while higher energy batteries can contain as high as sixteen plates per element. These elements typically vary in thickness from about 2.42 cm for the low energy batteries to about 4.24 cm for the high energy batteries, depending on the number of plates and the particular manufacturer's specifications. In most commercial batteries today, each cell element is spaced from the walls defining the cell compartment by relatively thick (e.g., ca 1.5 mm) ribs integrally molded normal to the walls which ribs engage the cell elements and hold them firmly in the center of the compartment. Larger ribs (i.e., in greater relief from the wall) are used for the thin cell elements and conversely smaller ribs for the thicker cell elements. These ribs are simply formed by cutting slots into the solid cores of the mold.

To provide a variety of battery models, many battery manufacturers inventory at least one case mold for each battery model and have to shut down their production lines to change over from one model to the next. Other manufacturers inventory a lesser number of molds, but provide additional inert spacers (e.g., extra separators) in each cell element to add thickness to the cell elements having fewer plates. This approach, however, adds the extra cost of the spacer and frequently complicates the in-plant handling of the cell element particularly during insertion into the container.

At least one manufacturer molds oversized ribs in a few standardized containers and then cuts the ribs back to the desired size depending on the thickness of the cell element destined for the particular container. This technique is disclosed in U.S. Pat. Thune No. 4,041,603, issued Aug. 16, 1977 and assigned to the assignee of the present invention. This approach requires a separate trimming operation and tools therefor.

Still other manufacturers have proposed molding thin (ca. 0.6 mm) resilient ribs at angles to the container walls which ribs deflect by an amount commensurate with the thickness of the cell element inserted in the cell compartment. However, molding containers of this type is difficult if the ribs are to have any substantial size (i.e., height and extension). In this regard, it is difficult, at best, to accurately machine thin, angled, slots into a mold core with conventional tools without creating some undercuts and backdrafts; and to polish the surfaces of such slots sufficiently to reduce drag on the ribs during container ejection. Even when relatively smooth-walled slots are provided, the large area of rib-forming mold surface relative to the thickness of the ribs creates sufficient resistance to stripping that the force required to free the ribs from the narrow slots often stretches and deforms the ribs. Occasionally, the ribs tear leaving portions thereof lodged in the slot which then necessitates shutdown and cleaning of the mold. Finally, experience has shown that such molds require excessively long molding cycle times: to insure adequate filling of the thin, poorly-vented, rib-forming cavity at the beginning of the cycle; and to free the ribs from the cavity without distortion during container stripping at the end of the cycle.

Accordingly, it is an object of the present invention to provide a commercially practical mold for injection molding a thermoplastic battery container having thin, inclined, resilient, retainer ribs projecting into the container's cell compartment(s), which mold can be readily machined and polished as well as operated at commercially practical molding cycle times and all without stretching, tearing or otherwise substantially deforming the ribs while stripping the container from the mold. This and other objects and advantages of the present invention will become more readily apparent from the detailed description thereof which follows.

BRIEF DESCRIPTION OF THE INVENTION

The present invention relates to a mold for injection molding thermoplastic battery containers having thin, inclined, resilient ribs molded on the compartment walls thereof to retain the battery's electrochemical innards. A preferred mold has a core-bearing portion which includes: a mandrel(s) for shaping the cell compartment(s); and means for stripping the container from the mandrel(s), wherein the stripping means includes a plurality of dovetail-shaped ejector bars reciprocally slideable within complementarily shaped mortises in the mandrel(s). More specifically, the invention comprehends the rib-forming portions of the mold cavity being formed in the diverging walls of the dovetailed-shaped ejector bars and between the ejector bars and the diverging (i.e., from the exterior surface of the mandrel) walls of the complementarily-shaped mortises. The ejector bar forms one side of the rib-forming cavity and the mortise wall forms the opposite side. The ejector bars and mortises are machined and polished separately before assembly. Hence, their critical surfaces are more readily accessible to the appropriate tools and more accurate finishing is possible. The ejector bars assist in stripping the container from the mandrel(s) by concurrently pushing on the bottom of the container and the tops of the ribs to free the container from the mandrels without distortion of the ribs. Moreover, the ejector bars travel with the container during ejection at least until the ribs are nearly clear of the mortises in the mandrel(s). This travelling of the ejector bars with the ribs virtually eliminates any drag on the ribs resulting from any interfacial adherence between the ribs and the ejector bars while the ribs are still confined to the narrow rib-forming cavities. This travelling, coupled with the pushing on the top of the ribs appears to reduce the force required to free the ribs from the cavity and shift some of it away from the base and roots of the ribs where heretofore it was concentrated and resulted in rib deformation. The stripping means also includes a typical stripper plate for engaging the rim of the container and applying stripping force thereto. In a preferred embodiment, the stripper plate and ejector bars move (i.e., about 7.5–8.0 cm) together until the tops of the ribs are nearly clear from the end(s) of the mandrel(s). At that time, the direction of the ejector bars is reversed and the stripper plate then pushes the now unconfined ribs free of the ejector bars and ultimately the remainder of the mandrel(s). While the stripper plate completes the stripping of the container from the mandrel(s), the ejector bars return to their retracted position and are ready for the next molding cycle. The rib-forming cavity vents between the ejector bars and mortises thereby permitting a more rapid and complete filling thereof during injection.

DETAILED DESCRIPTION OF A PREFERRED EMBODIMENT OF THE INVENTION

The invention may be better understood when considered in relation to the following description thereof which is made in conjunction with the several simplified drawings of a preferred mold and in which.

Figure 1:
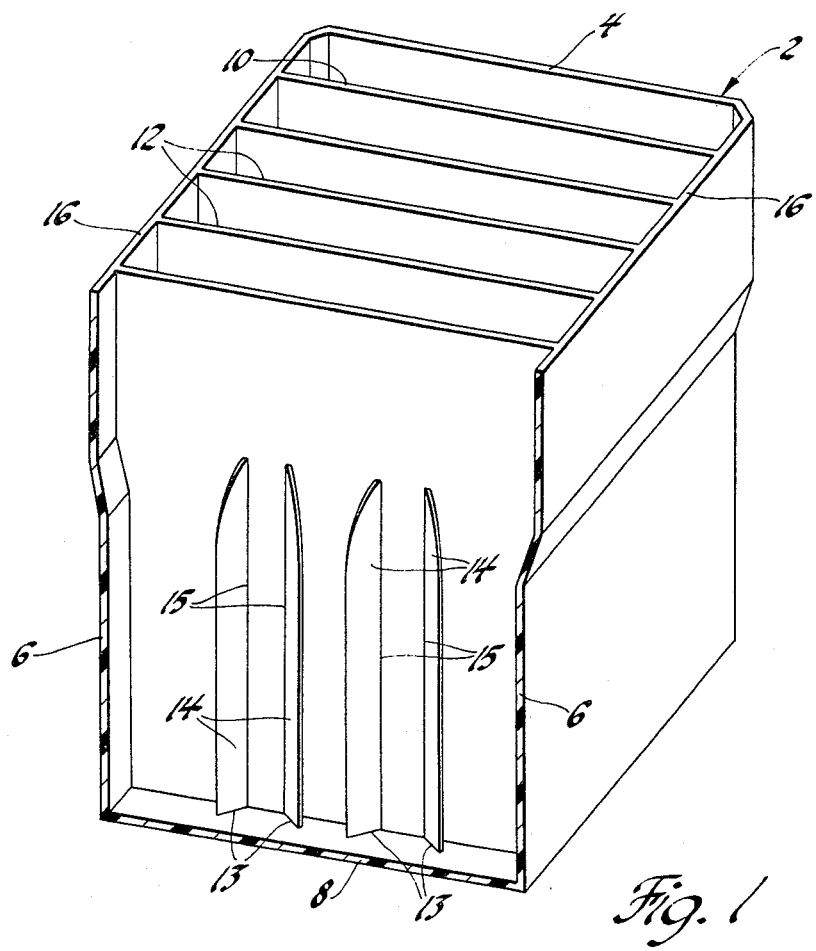
FIG. 1 illustrates a sectioned perspective view of a multicell battery container of the type molded in accordance with the present invention.
Figure 2:
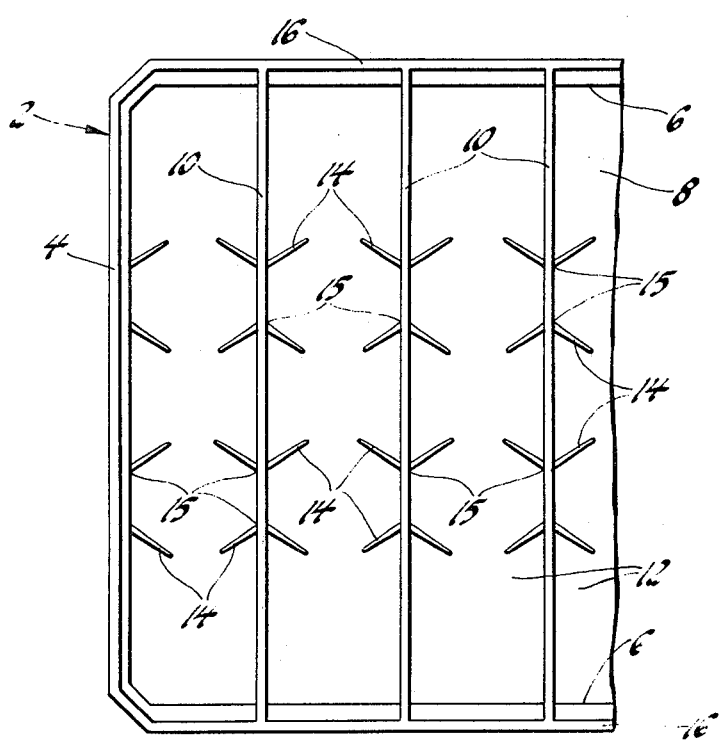
FIG. 2 illustrates a plan view of the battery container of FIG. 1.

FIGS. 1 and 2 illustrate perspective and plan views respectively of thermoplastic multicell battery containers 2 injection molded from molds made in accordance with the present invention. The invention, however, is equally applicable to single cell containers as well. End walls 4, side walls 6 and bottom wall 8 define the container 2, while intercell partitions 10 divide the container 2 into a plurality of individual cell compartments 12. The battery's electrochemically active innards (i.e., plates, separators, connectors, etc.) are inserted into each of the compartments 12 through the open top (i.e., defined by the rim 16) of the container and appropriately electrically connected to achieve the desired battery voltage. Thin, flexible ribs 14 are integrally molded with the intercell partitions 10 and end walls 4 and are disposed at an angle (e.g., about 60°) thereto. The ribs 14 have their bases 13 at the bottom 8 and their roots 15 at the partitions 10 and walls 4. The ribs 14 deflect commensurate with innards of varying thicknesses and serve to space the innards from the compartment walls and cushion them against damage due to vibration.

Mold Description

Figure 3:
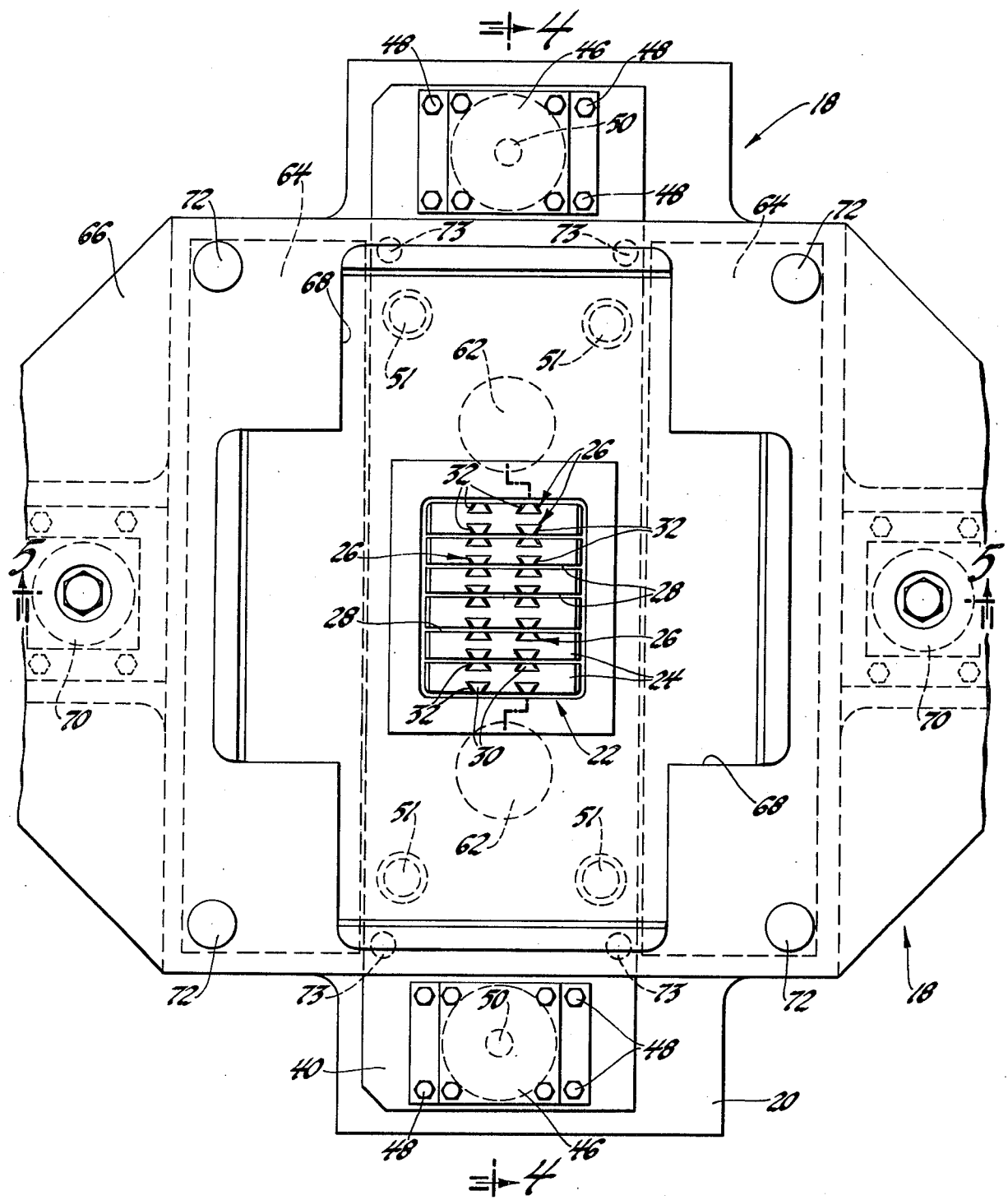
FIG. 3 illustrates a side elevational view of the core-bearing portion of a mold in the mold-open position (i.e., with the female portion of the mold displaced to the rear of the viewer)
Figure 4:
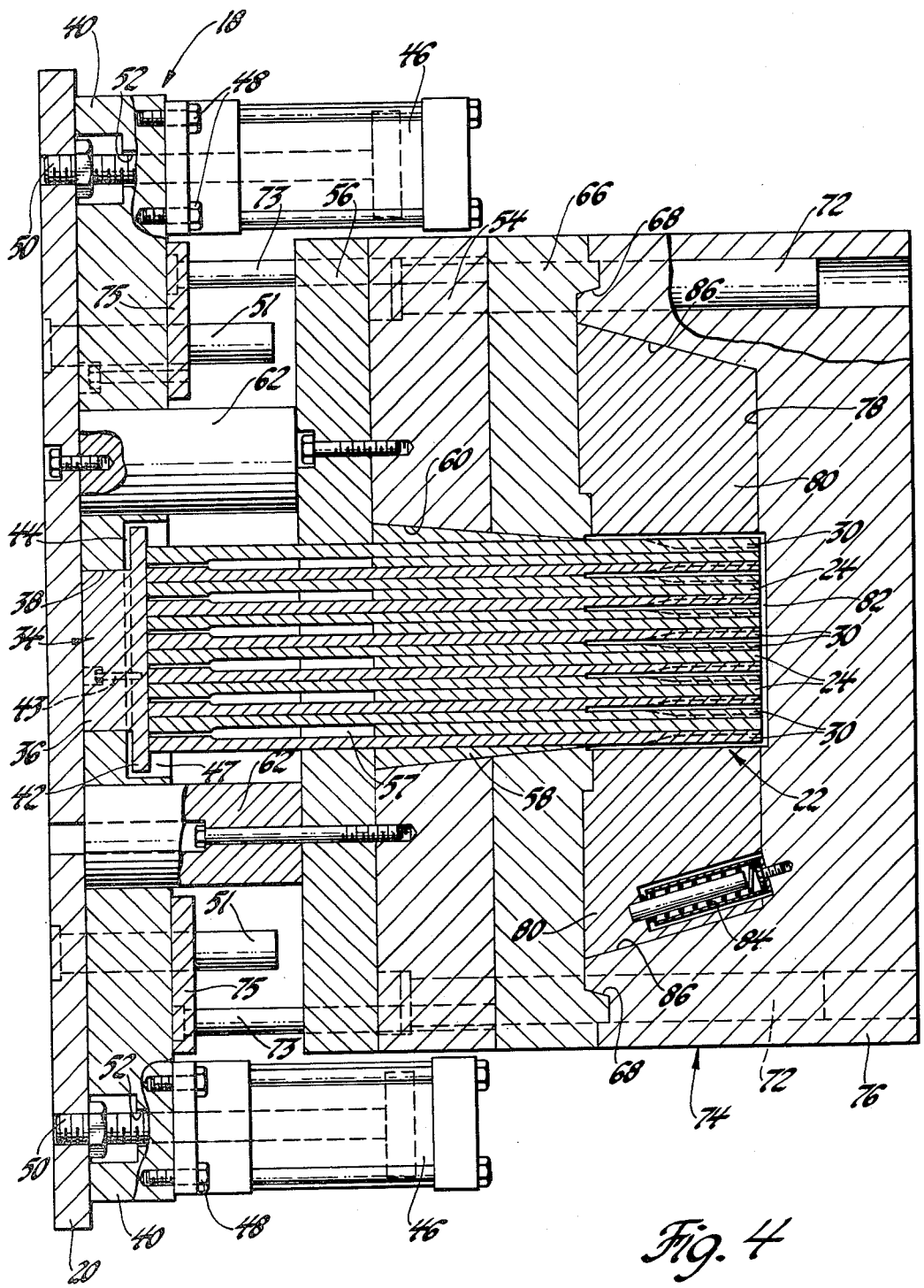
FIG. 4 is a sectioned front elevational view of the core-bearing portion of the mold taken in the direction 4—4 of FIG. 3, but in the mold-closed position (i.e., mated with the stationary/female portion of the mold)
Figure 5:
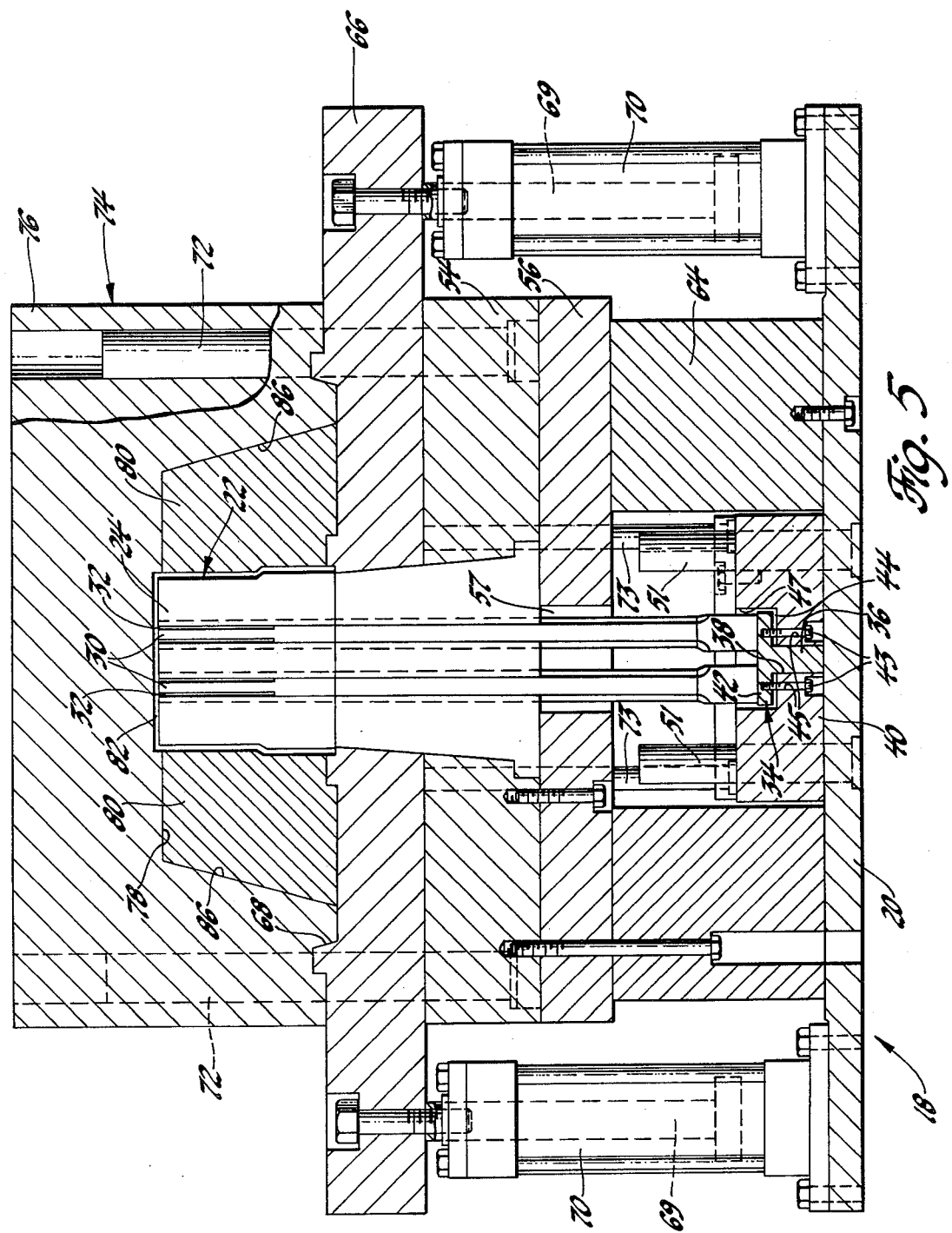
FIG. 5 is a sectioned bottom view of the core-bearing portion of the mold taken in the direction 5—5 of FIG. 3, but in the mold-closed position (i.e., mated with the stationary/female portion of the mold)

FIGS. 3–5 illustrate various views of the principal structural elements of a mold according to the present invention. FIG. 3 views the core-bearing portion 18 of the mold head-on in the mold-open position with the female or stationary portion of the mold to the rear of the viewer. In a press, the mold halves would move apart horizontally and separate along a vertical parting line. FIGS. 4 and 5, on the other hand, are views in the mold-closed position showing the core-bearing portion 18 with the stationary/female portion 74 of the mold in place and ready to receive the melt (e.g., polypropylene).

The core-bearing portion 18 of the mold includes a stationary backplate 20, a core 22 and means for stripping the container 2 from the core 22. The core 22 comprises a plurality of mandrels 24 sized to the compartments 12. The mandrels 24 include a plurality of pairs of dovetail-shaped (e.g., trapezoidal) mortises 26 formed in the molding surfaces 28 thereof. The mortises 26 of each pair are arranged back-to-back such that the ribs 14 formed therein will lie directly opposite each other in the battery compartment 12. Moreover, the mortises in one mandrel lie directly opposite the mortises in the next adjacent mandrel(s) so that the ribs 14 formed therein will lie directly opposite each other on opposite sides of the partition 10 formed between such ribs. A plurality of complementarily-shaped ejector bars 30 fit within the mortises 26 and are adapted to reciprocate therein as will be discussed hereinafter. Recesses 32 (see FIGS. 8 and 9) in the diverging faces 88 of the ejector bars 30 define the rib-forming cavities. The ejector bars 30 are joined to a pedestal 34 located in a groove 47 in an ejector actuating plate 40. The pedestal has a tenon portion 36 adapted to be slideably received in a mating opening 38 in the ejector actuating plate 40. A flange 42 on the pedestal 34 is spaced apart from the actuating plate 40 by a gap 44. Bolts 43 are slideably received in openings 45 in the ejector plate 40 and retain the pedestal 34 in the groove 47 in the plate 40, but are such as to permit relative movement between the pedestal 34 and plate 40 to accommodate shrinkage as will be discussed hereinafter.

The ejector actuator plate 40 is actuated by hydraulic cylinders 46 bolted to the plate 40 at 48. Cylinder rods 50 from the cylinders 46 slideably pass through openings 52 in the ejector plate 40 and adjustably attach to the stationary backplate 20 as illustrated (FIG. 4). Posts 51 are anchored to the plate 20 serve to guide the ejector plate 40 during stripping.

The mandrels 24 are held tightly together, and to the core-bearing portion 18, by means of stationary mounting plates 54 and 56. In this regard, the roots or bases 58 of the mandrels 24 flare outwardly and are mated with a complementarily-shaped opening 60 in the forward mounting plate 54. The rearward mounting plate 56 is then bolted to forward plate 54 and the mandrels wedged tightly together. The stationary mounting plates 54 and 56 are rigidly affixed to pillars 62 and rails 64 which in turn are rigidly affixed to the stationary backplate 20 and serve to space the plates 54-56 from the backplate 20. The ejector bars 30 extend from the pedestal 34 through an opening 57 in the rearward mounting plate 56 and thence through the mandrels 24.

A stripper plate 66 lies adjacent the forward mounting plate 54 and, in conjunction with the ejector bars 30, serves to strip the container 2 from the mandrels 24 following molding. The stripper plate 66 includes a cross-shaped recess 68 for mating with the stationary/female portion 74 of the mold as illustrated in FIGS. 4 and 5. The stripper plate 66 is bolted (see FIG. 5) to cylinder rods 69 of hydraulic cylinders 70 which are, in turn, bolted to the backplate 20. Four pilot posts 72 (see FIGS. 3, 6 and 7) are anchored to the forward stationary mounting plate 54 serve both to guide the stripper plate 66 and to register the core-bearing portion 18 of the mold with the stationary/female portion 74 during mold closing.

Four coordinating posts 73 are anchored to the ejector plate 40 by means of mounting plates 75. The coordinating posts 73 extend slideably through openings in the mounting plates 54-56 into contacting engagement with the backside of the stripper plate 66 and serve to maintain the spacing between the plates 40 and 66 during ejection.

The stationary/female portion of the mold 74 is shown in FIGS. 4 and 5 only, and comprises a main body 76 having a hollow 78 therein. In customary fashion, four cam doors 80 appropriately slide and fit within the hollow 78 to define a container-shaped mold cavity 82 therewith. Upon opening of the mold, a spring 84, acting in concert with appropriate linkage (not shown), causes the cam doors 80 to slide along the surfaces 86 and thereby move laterally away from the core 22 to release the outside of the container 2 from the mold. Upon closing, the cam doors 80 slide back into the position shown in FIGS. 4 and 5. Appropriate means (not shown) are provided to inject plastic into the cavity 82. Such stationary portions of the mold are well known in the art and require no further description.

Mold Operation

Figure 6:
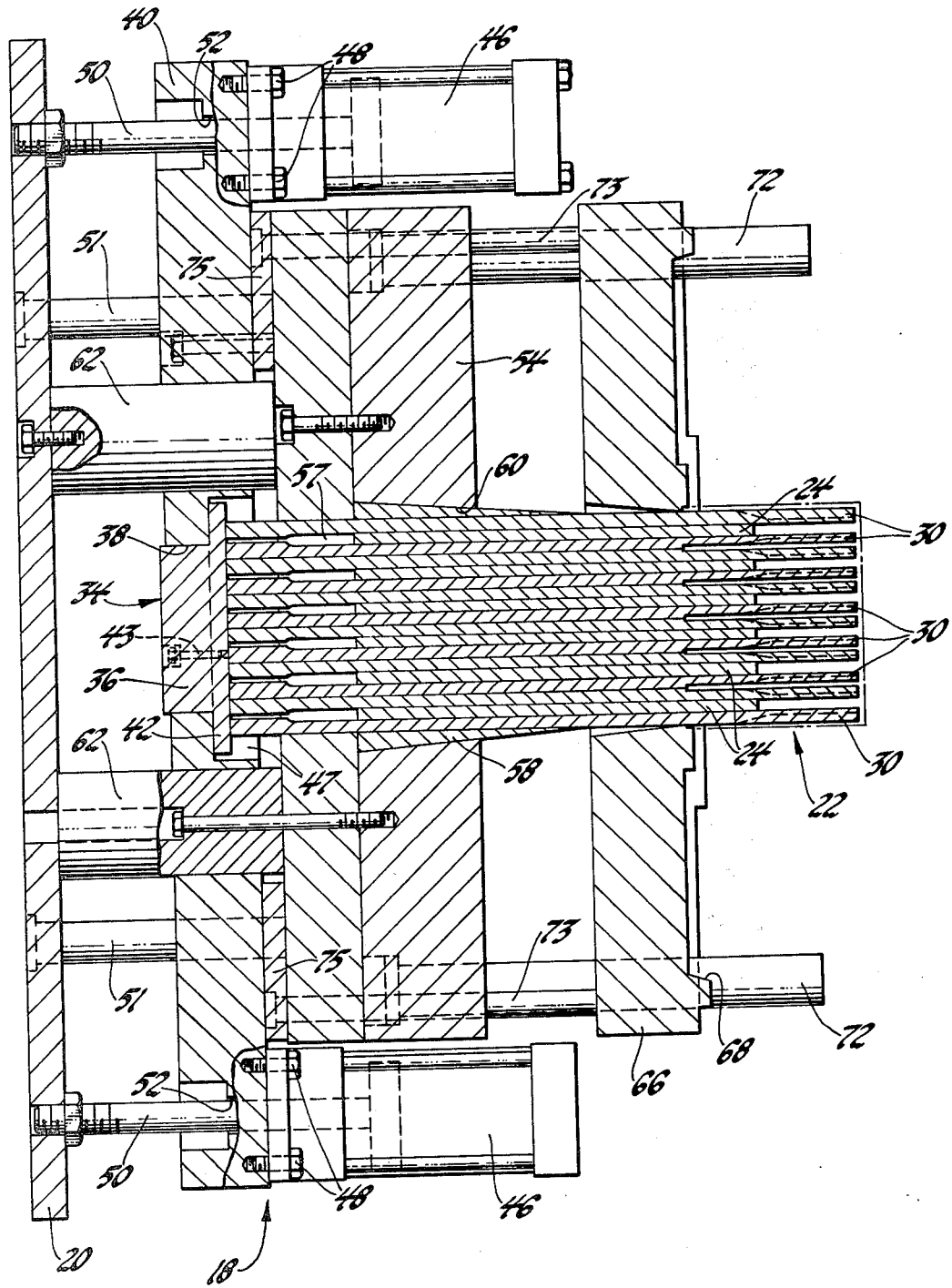
FIG. 6 is a sectioned front elevational view of the core-bearing portion of the mold shown in FIG. 4 (i.e., with the stationary/female portion of the mold displaced) early in the stripping cycle and showing the stripper plate in a partially forward position and the ejector bars in a fully forward position.
Figure 7:
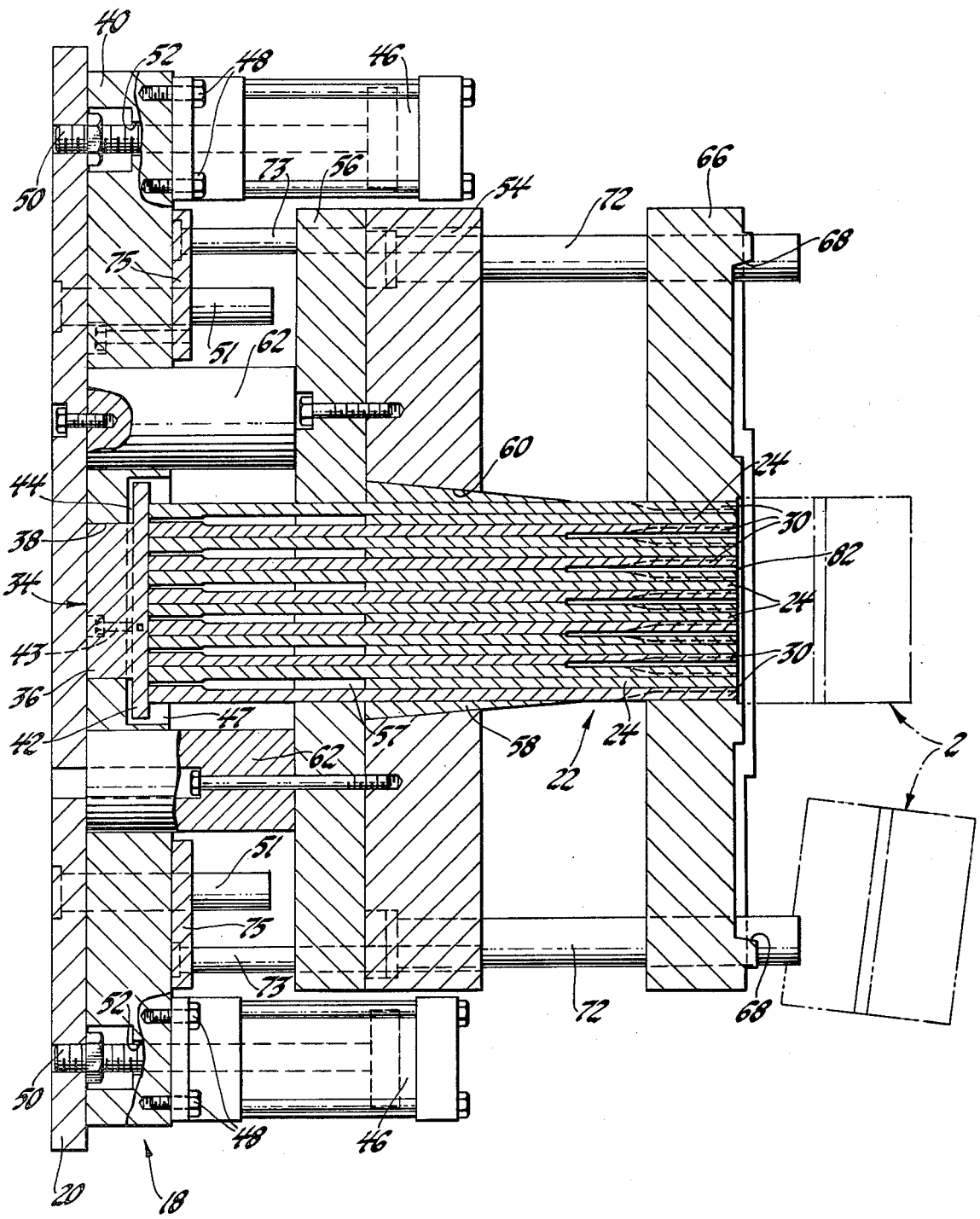
FIG. 7 is a sectioned front elevational view of the core-bearing portion of the mold shown in FIG. 4 (i.e., with the stationary/female portion of the mold displaced) late in the stripping cycle and showing the stripper plate in the fully forward position and the ejector bars in the retracted position.

FIGS. 6 and 7 show the location of the principal structural elements of the core-bearing portion 18 of the mold at different stages in the container-stripping cycle. After the injected thermoplastic has solidified in the mold cavity 82, the core-bearing portion 18 of the mold separates from the stationary/female portion 74 and carries with it the container 2 shrunk tightly about the core 22. At this stage, the several moving parts of the core-bearing portion 18 of the mold are substantially in the position shown in FIG. 4. After the cores 22 have cleared the stationary/female portion 74 of the mold, hydraulic cylinders 70 are energized and the stripper plate 66 advances slightly (i.e., about 0.050"-0.125") to engage the rim 16 of the container 2 which has receded slightly from the face of the stripper plate 66 due to shrinkage. This moves the stripper plate 66 slightly away from the forward mounting plate 54 and the ends of the coordinating posts 73. Hydraulic cylinders 46 are then energized to advance the ejector actuating plate 40 until the coordinating posts 73 again engage the backside of the stripper plate 66. At this time, the bolts 43 slide in their openings and the gap 44 between the actuating plate 40 and the pedestal 34 is closed. The gap 44 is set to match the amount of shrinkage occurring at the rim 16, and hence, prevents the ejector bars 30 from puncturing holes in the bottom of the container 2 before the stripper plate 66 can start to push the container 2 off the core 22. After these initial short moves, the stripper plate 66, ejector plate 40, pedestal 34 and ejector bars 30 move forward together to push the container 2 off the mandrels 24 as best shown in FIG. 6. The coordinating posts 73 hold the relative positions of the stripper and ejector plates 66 and 40 respectively and thereby prevent ejector plate 40 from overtaking stripper plate 66 and causing the ejectors 30 to puncture the bottom of the container 2.

When the ejectors 30 have advanced to the point (i.e., about 3"-3½") where the ribs 14 are substantially clear of the mandrels 24, the action of cylinders 46 is reversed as well as the direction of the ejector plate 40. When the ejector plate 40 reverses, the bolts 43 slide in their openings 45 until their heads engage the backside of the ejector plate 40 and pull the pedestal 34 back and retract the ejector bars 30 into the mandrels 24 (see FIG. 7). While the ejector bars 30 are retracting into the mandrels 24, the stripper plate 66 continues its forward movement to push the container 2 free from the mandrels 24 (see FIG. 7). Thereafter, the stripper plate 66 reverses direction and returns to the position shown in FIG. 4, the mold closed and the molding cycle repeated.

Figure 8:
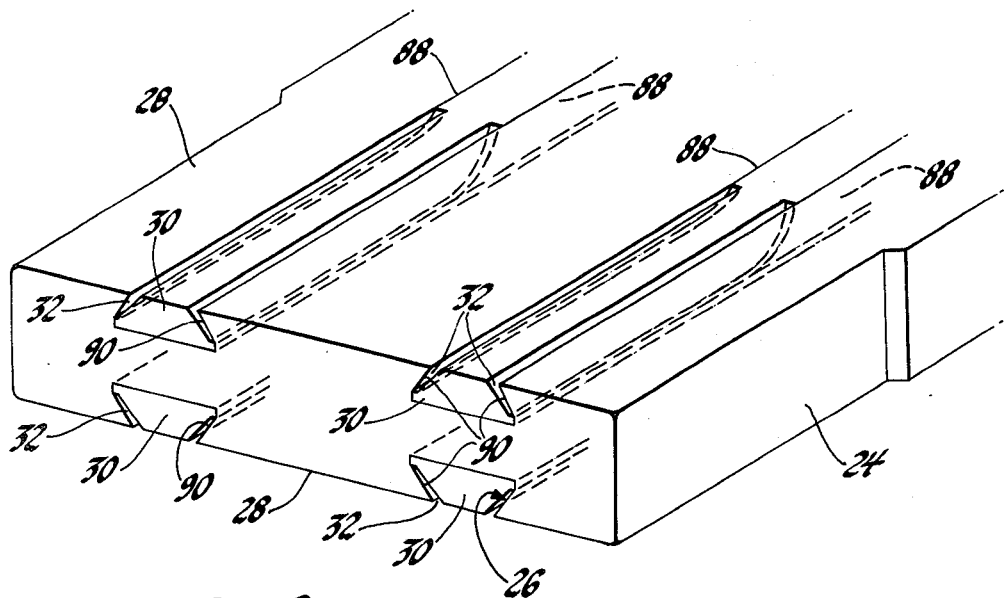
FIG. 8 is an enlarged perspective illustration of a mandrel and associated ejector bars in the retracted position.
Figure 9:
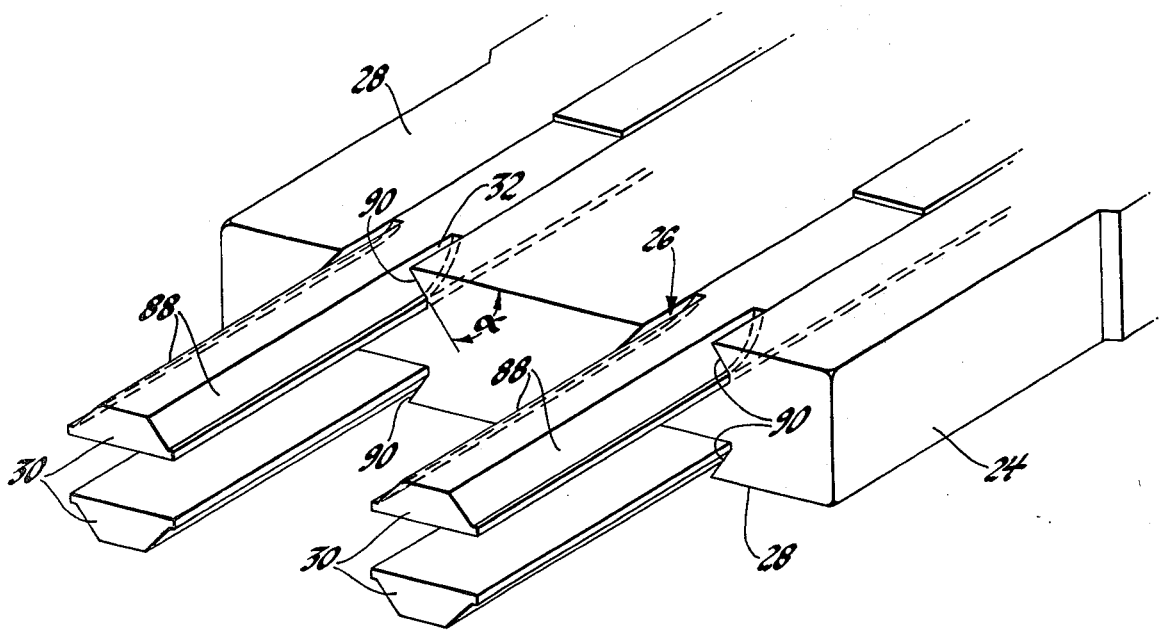
FIG. 9 is an enlarged perspective illustration of a mandrel and associated ejector bars in the fully extended position.

FIGS. 8 and 9 are enlarged perspective illustrations of typical mandrels 24 and ejector bars 30 made in accordance with the present invention. FIG. 8 shows the ejector bars 30 in their retracted or molding position. In this position, the recess 32 which is machined into the diverging faces 88 of the ejector bars 30 forms a rib-forming cavity with the corresponding walls 90 of the complementarily-shaped mortises 26. The walls 90 of the mortises 26 diverge from the surface 28 of the mandrel 24 at an angle which is substantially the same as the acute angle that the ribs 14 bear to the partitions 10 in the finished container 2.

While the invention has been disclosed primarily in terms of a single embodiment thereof, it is not intended to be restricted thereto, but rather only to the extent set forth in the claims which follow.

The embodiments of the invention in which an exclusive property or privilege is claimed are defined as follows:

1. A mold for injection molding a battery container having bottom, side and end walls defining a compartment for housing the electrochemical innards of said battery, said container having a plurality of thin, resilient ribs integral with and projecting at acute angles from said end walls into said compartment for holding said innards substantially centrally of said compartment, said mold including female and core-bearing portions coacting in a mold-closed position to define a mold cavity corresponding to said container, said core-bearing portion including a mandrel having an exterior surface for shaping the internal surface of said compartment and means for stripping said container from said mandrel, said stripping means including:

a plurality of dovetail-like mortises in said mandrel, each mortise being defined in part by opposing side walls diverging from said surface at substantially said acute angle;
substantially complementary-shaped ejector bars reciprocally slideable within said mortises, said ejector bars each being defined in part by opposing faces juxtaposed said mortise side walls and being adapted for movement between an extended container-release position and a retracted container-molding position;
a recess in each of said faces defining a rib-forming cavity between said ejector bar and an associated mortise side wall while said ejector bar is in said retracted position; and
means for moving said ejector bars between said retracted and extended positions such that said ejector bars travel with said ribs to free said ribs from said rib-forming cavity at the time said container is stripped from said mandrel.

2. A mold for injection molding a battery container having bottom, side and end walls defining a compartment for housing the electrochemical innards of said battery, said container having an opening for access to said compartment and a plurality of thin, resilient ribs integral with and projecting at acute angles from said end walls into said compartment for holding said innards substantially centrally of said compartment, said mold including female and core-bearing portions coacting in a mold-closed position to define a mold cavity corresponding to said container, said core-bearing portion including a mandrel having an exterior surface for shaping the internal surface of said compartment and means for stripping said container from said mandrel, said stripping means including first and second means for pushing upon said container at said opening and bottom wall respectively to release it from the mandrel, said second means comprising:
a plurality of dovetail-like mortises in said mandrel, each mortise being defined in part by opposing side walls diverging from said surface at substantially said acute angle;
substantially complementary-shaped ejector bars reciprocally slideable within said mortises, said ejector bars each being defined in part by opposing faces juxtaposed said mortise side walls and being adapted for movement between an extended container-release position and a retracted container-molding position;
means for moving said ejector bars between said extended and retracted positions; and
a recess in each of said faces defining a rib-forming cavity between said ejector bar and an associated mortise side wall;
said ejector bars being in the retracted position for forming said rib-forming cavity during molding, and thereafter travelling with said rib to said extended position to free said rib from said rib-forming cavity without untoward resistance or permanent deformation of the ribs.

3. A mold for injection molding a multicell battery container having bottom, side and end walls, and at least one partition parallel to said end walls and dividing said container into at least two compartments for housing the electrochemical innards of said battery, said container having an opening for access to said compartments and a plurality of thin, resilient ribs integral with and projecting at acute angles from said partition and end walls into said compartments for holding said innards substantially centrally of said compartments, said mold including female and core-bearing portions coacting in a mold-closed position to define a mold cavity corresponding to said container, said core-bearing portion including a plurality of mandrels each having an exterior surface for shaping the internal surface of said compartment and means for stripping said container from said mandrels, said stripping means including first and second means for pushing upon said container at said opening and bottom wall respectively to release it from the mandrels, said second means comprising:
a plurality of dovetail-like mortises in said mandrels, each mortise being defined in part by opposing side walls diverging from said surface at substantially said acute angle;
substantially complementary-shaped ejector bars reciprocally slideable within said mortises, said ejector bars each being defined in part by opposing faces juxtaposed said mortise side walls and being adapted for movement between an extended container-release position and a retracted container-molding position;
means for moving said ejector bars between said extended and retracted positions; and
a recess in each of said faces defining a rib-forming cavity between said ejector bar and an associated mortise side wall;
said ejector bars being in the retracted position for forming said rib-forming cavity during molding, and thereafter travelling with said ribs to said extended position to free said ribs from said rib-forming cavity without untoward resistance or permanent deformation of the ribs.

4. A mold for injection molding a multi-cell battery container having bottom, side and end walls, and a plurality of partitions parallel to said end walls and dividing said container into a plurality of compartments for housing the electrochemical innards of said battery, said container having an opening for access to said compartments and a plurality of thin, resilient ribs integral with and projecting at acute angles from said partitions and end walls into said compartments for holding said innards substantially centrally of said compartments, said mold including female and core-bearing portions coacting in a mold-closed position to define a mold cavity corresponding to said container, said core-bearing portion including a plurality of mandrels, each having an exterior surface for shaping the internal surface of said compartment and means for stripping said container from said mandrels, said stripping means including first and second means for pushing upon said container at said opening and bottom wall respectively to release it from the mandrels, said second means comprising:
a plurality of dovetail-like mortises in said mandrels, each mortise being defined in part by opposing side walls diverging from said surface at substantially said acute angle;
substantially complementary-shaped ejector bars reciprocally slideable within said mortises, said ejector bars each being defined in part by opposing faces juxtaposed said mortise side walls and being adapted for movement between an extended container-release position and a retracted container-molding position;
means for moving said ejector bars between said extended and retracted positions;

a recess in each of said faces defining a rib-forming cavity between said ejector bar and an associated mortise side wall; and means for coordinating the movement of said ejector bars and said first stripping means during stripping to prevent said ejector bars from overtaking said first means and puncturing the bottom of said container;

said ejector bars being in the retracted position for forming said rib-forming cavity during molding, and thereafter travelling with said ribs to said extended position to free said ribs from said rib-forming cavity without untoward resistance or permanent deformation of the ribs.

5. A mold for injection molding a battery container having bottom, side and end walls and at least one partition parallel to said end walls and dividing said container into at least two compartments for housing the electrochemical innards of said battery, said container having a plurality of thin, resilient ribs integral with and projecting at acute angles from said partition and end walls into said compartments for holding said innards substantially centrally of said compartments, said mold including female and core-bearing portions coacting in a mold-closed position to define a mold cavity corresponding to said container, said core-bearing portion including a plurality of mandrels each having an exterior surface for shaping the internal surface of an associated compartment and means for stripping said container from said mandrels, said stripping means including:

a plurality of mortises in said mandrels each mortise being defined in part by at least one wall angling inward from said mandrel surface at substantially said acute angle;

substantially complementary-shaped ejector bars reciprocally slideable within said mortises, said ejector bars each being defined in part by at least one face juxtaposed said mortise side wall and being adapted for movement between an extended container-release position and a retracted container-molding position;

a recess in said face of said bar defining a rib-forming cavity between said ejector bar and an associated mortise wall while said ejector bar is in said retracted position; and means for moving said ejector bars between said retracted and extended positions such that said ejector bars travel with said ribs to free said ribs from said rib-forming cavity at the time said container is stripped from said mandrel.

6. A mold for injection molding a multicell battery container having bottom, side and end walls, and at least one partition parallel to said end walls and dividing said container into at least two compartments for housing the electrochemical innards of said battery, said container having an opening for access to said compartments and a plurality of thin, resilient ribs integral with and projecting at acute angles from said partition and end walls into said compartments for holding said innards substantially centrally of said compartments, said mold including female and core-bearing portions coacting in a mold-closed position to define a mold cavity corresponding to said container, said core-bearing portion including a plurality of mandrels each having an exterior surface for shaping the internal surface of said compartment and means for stripping said container from said mandrels, said stripping means including first and second means for pushing upon said container at said opening and bottom wall respectively to release it from the mandrels, said second means comprising:

at least two pairs of dovetail-like mortises in said mandrels, each mortise being defined in part by opposing side walls diverging from said surface at substantially said acute angle and each pair including mortises arranged back to back on opposite surfaces of said mandrel;

substantially complementary-shaped ejector bars reciprocally slideable within said mortises, said ejector bars each being defined in part by opposing faces juxtaposed said mortise side walls and being adapted for movement between an extended container-release position and a retracted container-molding position;

means for moving said ejector bars between said extended and retracted positions;

a recess in each of said faces defining a rib-forming cavity between said ejector bar and an associated mortise side wall;

said ejector bars being in the retracted position for forming said rib-forming cavity during molding, and thereafter travelling with said ribs to said extended position to free said ribs from said rib-forming cavity without untoward resistance or permanent deformation of the ribs.

* * * * *